United States Patent

Kono et al.

[11] Patent Number: 5,727,637
[45] Date of Patent: Mar. 17, 1998

[54] HITCH STRUCTURE FOR WORK MACHINE

[75] Inventors: Masakatsu Kono; Yositaka Oota; Masayuki Yamamoto, all of Wako, Japan

[73] Assignee: Honda Giken Kogyo Kabushiki Kaisha, Japan

[21] Appl. No.: 717,490

[22] Filed: Sep. 20, 1996

[30] Foreign Application Priority Data

Oct. 12, 1995 [JP] Japan ............................ 7-263911
Jul. 2, 1996 [JP] Japan ............................ 8-172175

[51] Int. Cl.$^6$ ............................................. A01B 51/00
[52] U.S. Cl. ........................ 172/272; 280/508; 414/703
[58] Field of Search .......................... 37/348, 900; 172/112,
172/272, 275, 269, 439, 311, 413; 180/14.1,
53.1, 53.3; 280/477, 508; 914/701, 703

[56] References Cited

U.S. PATENT DOCUMENTS

| | | | |
|---|---|---|---|
| 4,397,604 | 8/1983 | McCain | 172/275 X |
| 4,415,175 | 11/1983 | Kainer | 172/272 X |
| 5,050,684 | 9/1991 | Vollmer | 172/272 |
| 5,333,695 | 8/1994 | Walter | 172/272 |
| 5,456,030 | 10/1995 | Barone et al. | 172/272 X |

FOREIGN PATENT DOCUMENTS

7156835  8/1993  Japan.

*Primary Examiner*—Terry Lee Melius
*Assistant Examiner*—Robert Pezzuto
*Attorney, Agent, or Firm*—Adams & Wilks

[57] ABSTRACT

A hitch structure comprises a support frame adapted to be mounted to a tail portion of a work vehicle, a tube supported crosswise on the support frame and a hitch for connecting a work machine to the work vehicle. The hitch is comprised of an upper jaw plate and a lower jaw plate joined together by a pin in such a manner as to be capable of opening and closing actions, whereby the jaw plates can cooperate to hold the tube on the support frame. The hitch structure thus allows easy mounting and releasing, produces little play, and is free from worries about its parts being lost.

19 Claims, 8 Drawing Sheets

HITCH STRUCTURE FOR WORK MACHINE

BACKGROUND OF THE INVENTION

1. Field of the Invention

The present invention relates to an improvement in a hitch structure for connecting a work machine such as a tiller to a work vehicle.

2. Description of the Related Art

Figure 8:
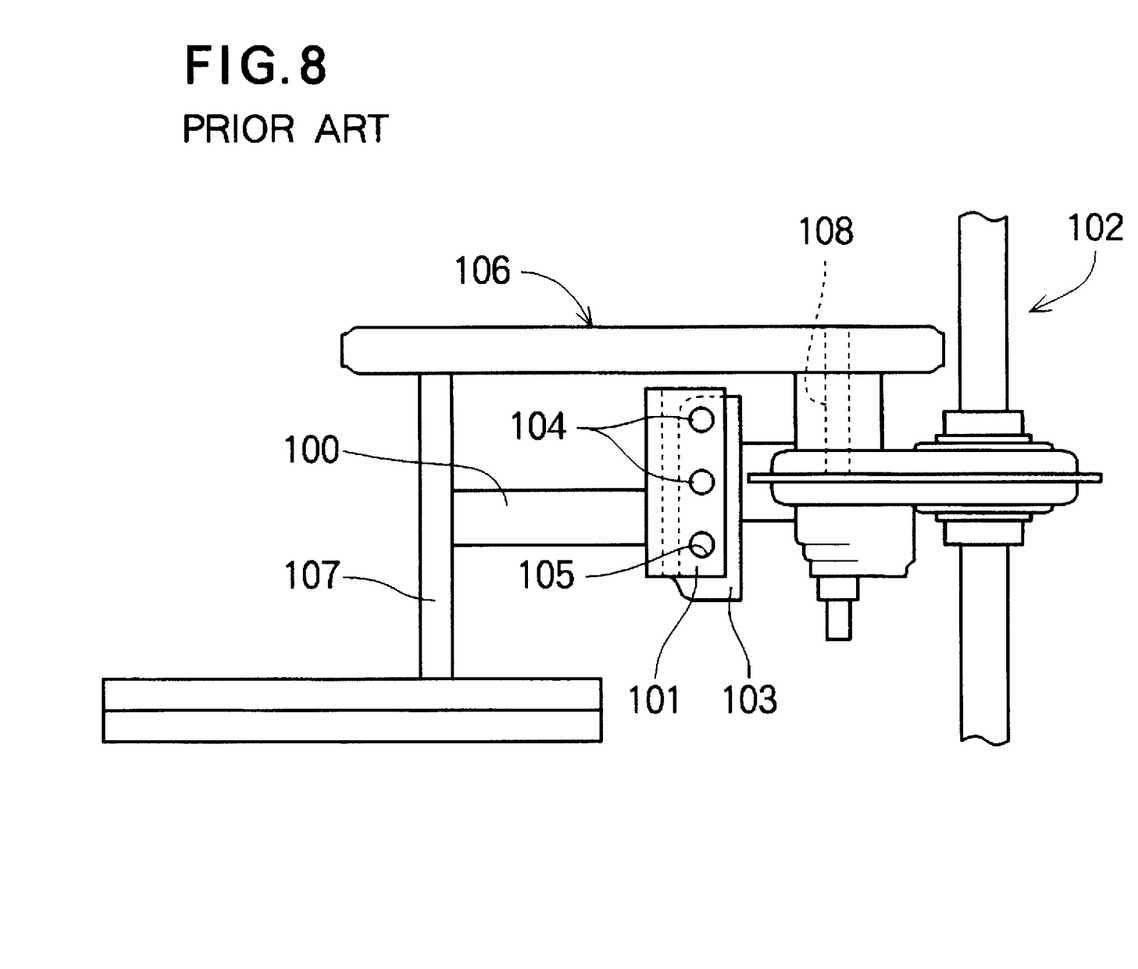
FIG. 8 is a top plan view of a conventional hitch structure.

Japanese Patent Laid-Open Publication No. HEI 7-156835, for example, discloses a riding type administrative machine or a work machine as shown in FIG. 8 hereof. In this figure, a hitch arm 100 extends from a body of the work vehicle and includes at a top end thereof a hitch body 101 of backwardly-opened U-shaped configuration as seen from sideways. A hitch 103 of a tiller 102 is detachably connected to the hitch body 101 by means of a connector pin 104. Reference numeral 105 designates a hole for allowing insertion of the connector pin. Reference numeral 106 designates a transmission case. Designated by reference numerals 107, 108 are shafts.

The foregoing work machine has drawbacks in that since there is an inevitable clearance or play between the connector pin hole 105 and the connector pin 104, the distance between the shaft 107 and the shaft 108 varies and thus adversely affects a chain of the machine, in that since insertion and pullout of the connector pin 104 are involved, the connector pin 104 is liable to be lost, and in that difficulty is experienced in fitting the connector pin 104 into the connector pin hole 105.

SUMMARY OF THE INVENTION

It is therefore an object of the present invention to provide a hitch structure which produces no clearance or play as found in the conventional hitch structure and no concern about its parts being lost and allows easy mounting and releasing.

To attain the above object, there is provided according to the present invention a hitch structure comprising a support frame adapted to be mounted to a front-to-rear direction end of a work vehicle, a cover tube supported crosswise on the support frame and a hitch for connecting a front-to-rear direction end of a work machine to the tube, wherein the hitch comprises at least one upper jaw plate and at least one lower jaw plate, each having a recess for receiving the tube, one of the jaw plates being pivotally connected to other one of the jaw plates by means of a pin so as to cooperate with the other jaw plate to hold the tube, and a moving member for moving the one jaw plate toward a holding direction, whereby the upper and lower jaw plates can cooperate to hold the tube on the vehicle side as if by a clothespin. Consequently, the hitch structure thus arranged has little play, prolongs the lives of the drive parts around the hitch, and enables easy mounting and releasing thereof.

Preferably, the moving member is comprised of a bolt and a nut, which are secured such that they do not come off the hitch. As a result, there is no concern about parts of the hitch structure being lost, thus avoiding care which should otherwise be taken for safekeeping and management of the parts upon replacement of the work machine.

Desirably, the nut is provided with a finger hooking bar so that the nut can be manually fastened and unfastened easily by hooking fingers thereon. This makes the mounting and releasing operations of the work machine easy since no special tools are required.

In a preferred form, the hitch structure further comprises a hydraulic cylinder mounted to an end of the work vehicle and a downwardly-opened U-notch disposed at an end of the work machine and receiving a top end of a piston rod of the hydraulic cylinder, whereby the top end of the piston rod can be moved downwardly for removal from the U-notch as the work machine is released from the work vehicle. Consequently, compared to the conventional arrangement in which the top end of the piston rod is secured to and released from the work machine by insertion and pullout of a pin, the hitch structure according to the present invention is free from worries about the pin being lost since it does not require pin insertion and pullout. The hitch structure also enables single-touch releasing of the work machine from the hydraulic cylinder and easy mounting and releasing of the work machine.

Additional advantages and features of the present invention will become apparent from the following description and appended claims, when taken in conjunction with the accompanying drawings.

DETAILED DESCRIPTION OF THE PREFERRED EMBODIMENT

A preferred embodiment of the present invention will now be described in more detail with reference to the drawings.

Figure 1:
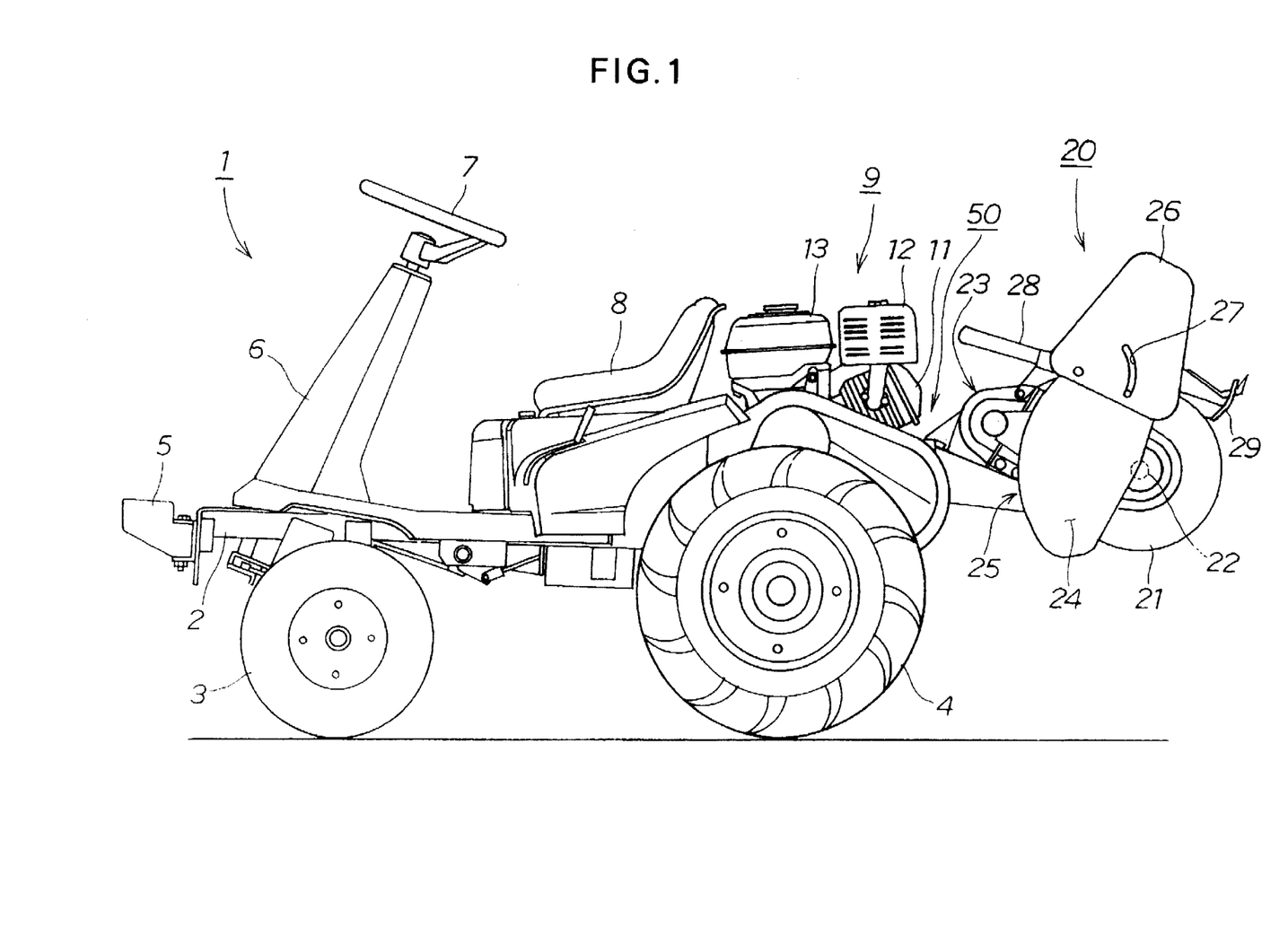
FIG. 1 is a side elevational view of a work vehicle with a rotary tiller connected thereto by means of a hitch structure according to the present invention.

Referring to FIG. 1, a relatively small, light-weighted work vehicle 1 includes a vehicle body frame 2 having front wheels 3 (only one shown) of reduced diameter and rear wheels 4 (only one shown) of increased diameter respectively disposed at a front portion and at a rear portion of the body frame 2. From the fore side to the rear side, the vehicle 1 also includes front weights 5 (only one shown) provided at a front end of the frame, a steering wheel post 6, a steering wheel 7, a driver seat 8, and an engine 9 (having a cylinder head 11, a muffler 12 and a fuel tank 13 disposed at an upper part of the vehicle body). The work vehicle 1 further carries at a rear portion thereof a work machine 20 such as a rotary tiller 20 releasably suspended therefrom.

The rotary tiller 20, shown in FIG. 1 as being ascended by a hydraulic cylinder (not shown), has a tiller pawl member 21 which is driven for normal and reverse rotation by a driving force supplied from the engine 9 through a transmission system. In the embodiment being described, the tiller pawl member 21 is disposed coaxially with a tiller shaft 22 and is comprised of a plurality of normal rotation pawls and a plurality of reversal rotation pawls.

Designated by reference numeral 23 is a reduction gear case covering a reduction gear for transmitting a driving force of the engine 9 to a tiller shaft 22 at a reduced rate. Designated by reference numeral 24 is a rotary side cover for covering both sides of a rotary cover 25 which in turn covers an upper half of the tiller pawl member 21. A position-adjustable side rear cover 26 is mounted to a rear part of the rotary cover 25 and has a curved slit 27 for that purpose.

Reference numeral 28 designates a resistive rod having at a top (lower) end thereof a tail sledge or a depth adjusting shoe 29 for adjusting the depth of plow.

Figure 2:
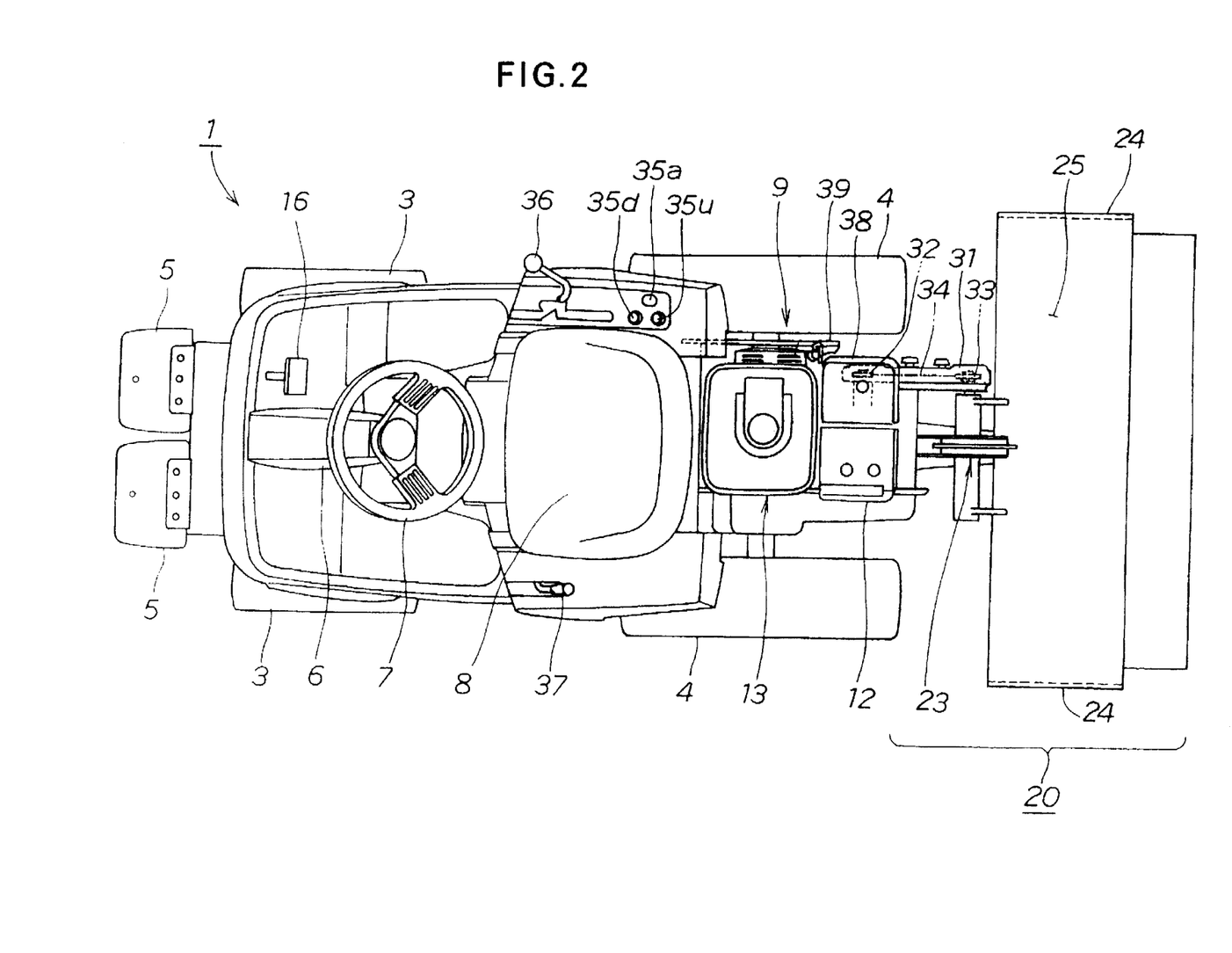
FIG. 2 is a top plan view of the work vehicle.

Reference is now had to FIG. 2 in which the work vehicle of FIG. 1 is shown as seen from above (with the rotary tiller 20 being shown schematically). The work vehicle 1 further includes an operation pedal 16 and a chain case 31 as part of the transmission, in addition to the front weights 5, steering wheel 7, driver seat 8, engine 9, rotary tiller 20 and reduction gear case 23 mentioned above.

The chain case 31 accommodates a drive sprocket 32, a driven sprocket 33 and a chain 34 in a sealed fashion. The reduction gear case 23 accommodates plural gears not shown, a sprocket and a chain in a sealed fashion. Thus, there is no concern of rain and dirt coming inside the chain case 31 and reduction gear case 23.

Adjacent to the seat 8 there are provided an automatic ascent-descent button 35a, a manual descent button 35d and a manual ascent button 35u of a control apparatus for effecting up and down movements of the work machine.

Manual ascent and descent buttons 35d, 35u are what may be called inch-stop buttons and are capable of moving the work machine upwardly and downwardly inch by inch by repeating ON/OFF thereof. Continued pressing of the manual ascent button 35U will bring the work machine to a topmost position where the machine automatically stops. Pressing of the manual descent button 35d causes a piston rod 44 of a hydraulic cylinder 43 (FIG. 3) to be brought down to a position where the work machine can be released. Further details will be discussed below.

Designated by numeral 36 is a shift or speed changing lever. 37 designates a lever for starting and stopping the rotational movement of the tiller pawl member. Reference numerals 38 and 39 designate an air cleaner and a starter grip, respectively.

Figure 3:
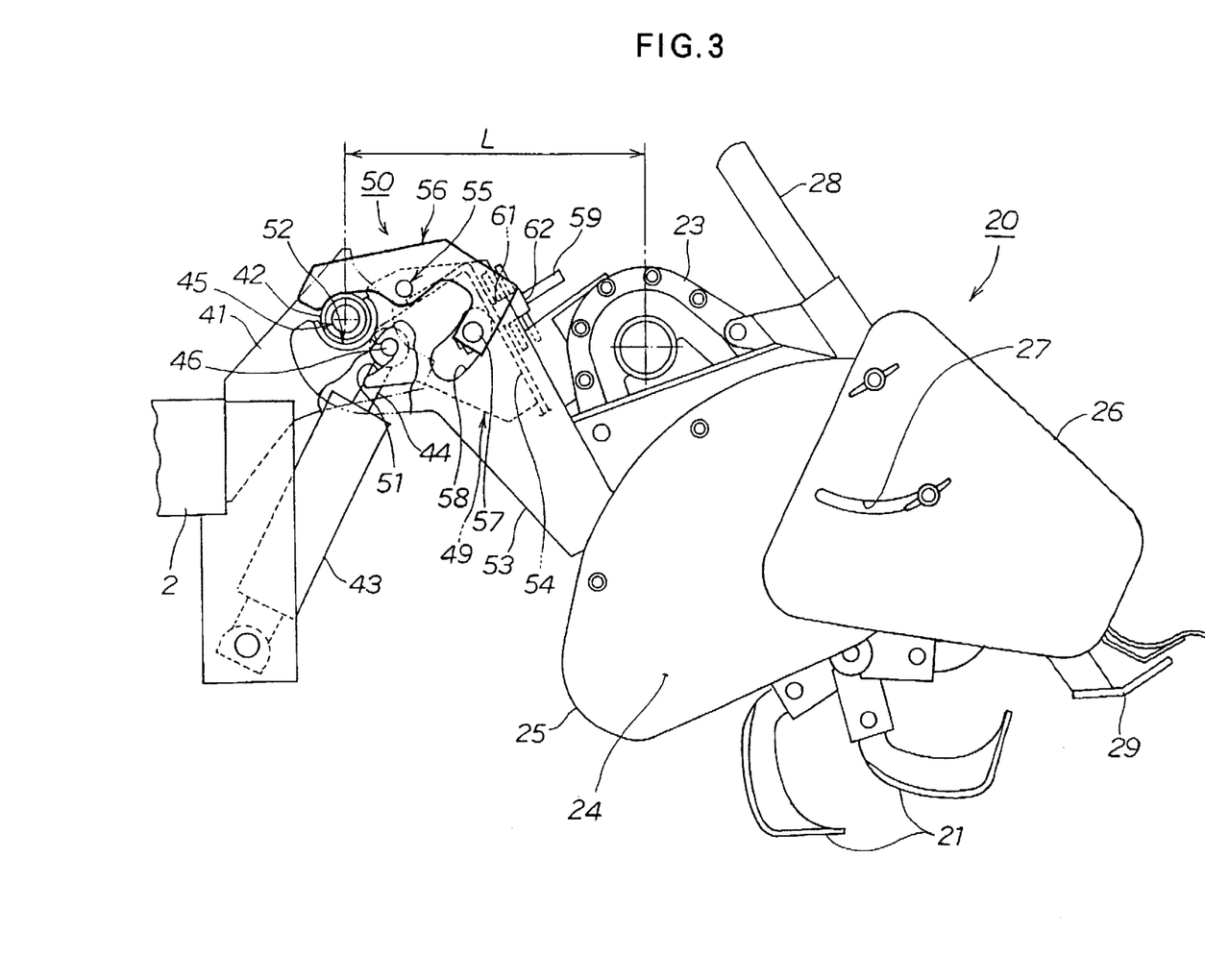
FIG. 3 is a detailed side elevational view of the hitch structure according to the present invention and the associated work machine.

Reference is now had to FIG. 3 in which a hitch structure according to the present invention and associated work machine are shown in side elevation.

Body frame 2 has support frames 41 mounted to a tail portion thereof, between which support frames a cover tube 42 extends crosswise. A hitch 50 according to the present invention is hooked or hung onto the cover tube 42. Pivotally mounted to a lower part of the support frames 41 is the hydraulic cylinder 43 for effecting up and down movements of the work machine. Lower jaw plates 53, 53 spaced apart from each other in a front-to-back direction of the sheet of the figure are connected by a connector plate 54 of L-shaped cross section. Two brackets 49, 49 extend from the connector plate 54 along inner surfaces of the lower jaw plates 53, 53 and have U-notches 51, 51 at top ends thereof.

By insertion of a top end of the piston rod 44 of the hydraulic cylinder 43 into the U-notches 51, 51 of the brackets 49, 49 on the hitch 50 side, the work machine is mounted to the work vehicle. By provision of such U-notches 51, 51, mounting and releasing operations of the work machine relative to the work vehicle have been rendered easy. By virtue of this arrangement, it is no longer necessary for a pin to be inserted into and pulled out from the top end of the piston rod 44 of the hydraulic cylinder 43 as in the conventional arrangement.

To this end, the hitch 50 is comprised of lower jaw plates 53, 53 each having a large trapezoidal configuration and a recess 52, a connector plate 54 of L-shaped cross section for connecting the lower jaw plates 53, 53 arranged to be displaced or spaced apart in a front-and-back direction of the sheet of the figure, substantially L-shaped upper jaw plates 56, 56 each having a recess 56a and joined surfacewise with the respective lower jaw plates 53, 53 by means of a pin 55 in such a manner as to be pivotable relative to the lower jaw plates 53, 53, a cross shaft 57 lockingly engaged with tail portions of the upper jaw plates 56, 56 (only one shown), arc-shaped grooves 58, 58 disposed in the lower jaw plates 53, 53 (only one shown) for allowing passage of the cross shaft 57, a bolt 59 and a nut 61 as a moving member for upwardly moving the cross shaft 57, and a lock nut 62. The moving member may preferably be a bolt 59 and a nut 61 but should not be limited thereto. Pinion rack, worm gear and equalizer type devices, for example, may also be used for moving and retaining the cross shaft 57 in position.

Figure 4:
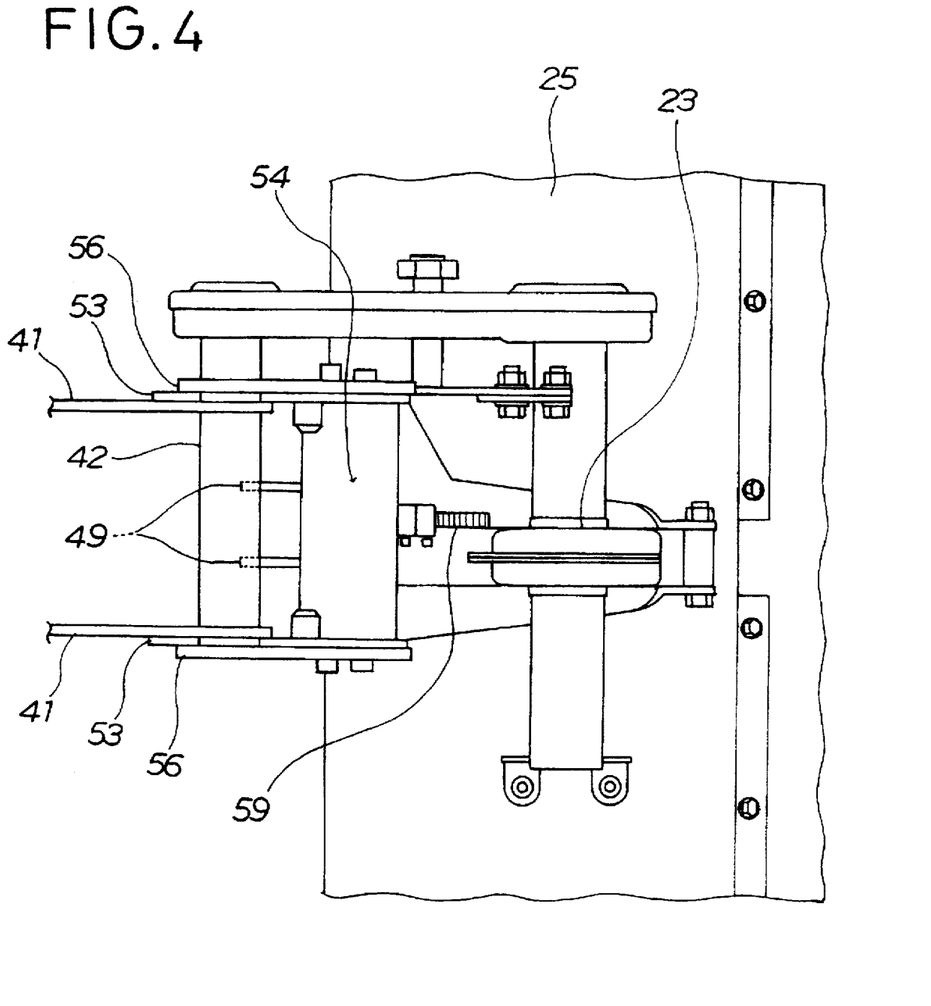
FIG. 4 is a top plan view of the hitch structure.

Referring now to FIG. 4, the cover tube 42 is disposed to extend crosswise between the support frames 41, 41 and held between the lower jaw plates 53, 53 and upper jaw plates 56, 56 in a sandwiched manner. The brackets 49, 49 project from the connector plate 54 which connects the lower jaw plates 53, 53.

Figure 5:
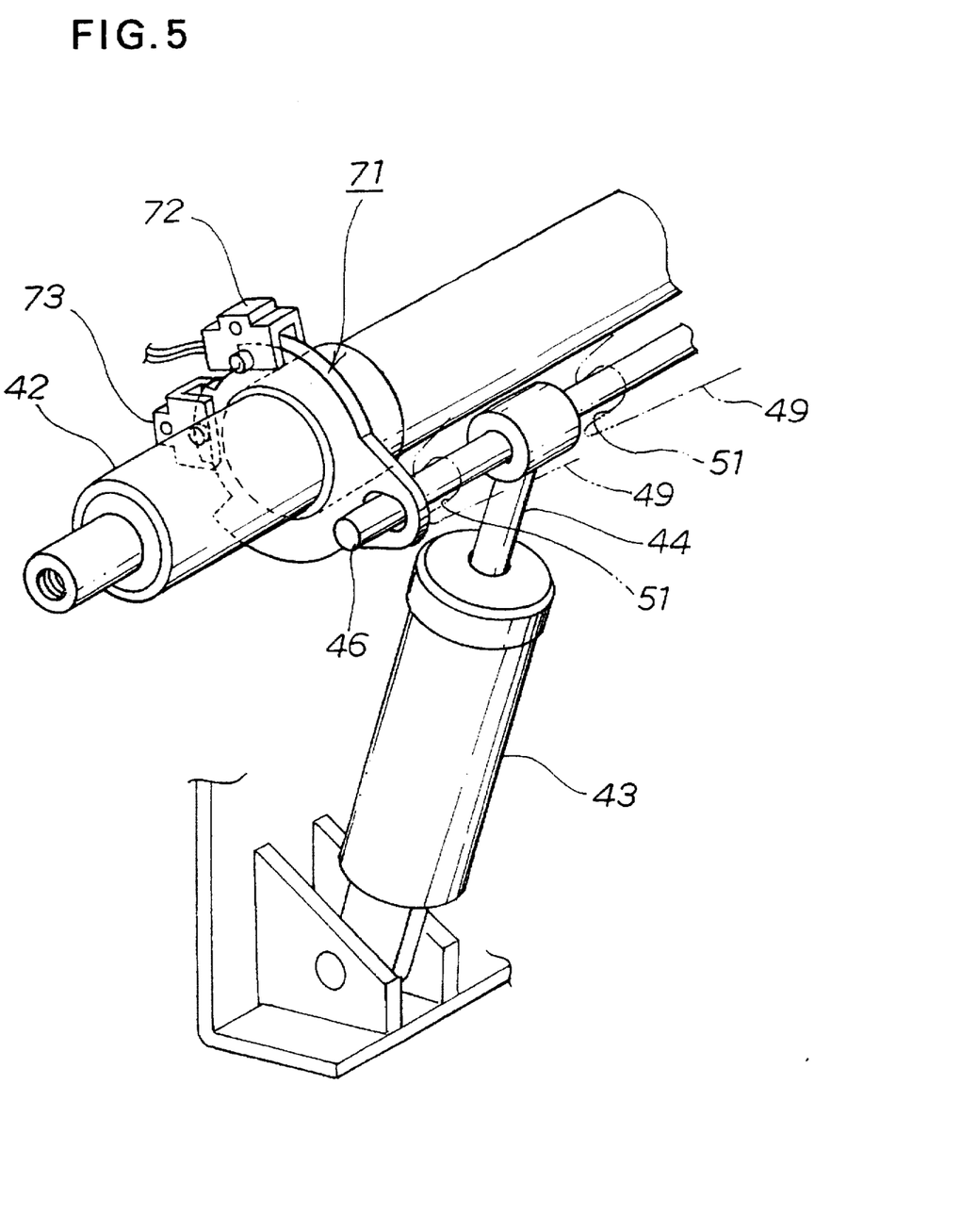
FIG. 5 is a perspective view showing the positioning of a hydraulic cylinder relative to a U-notch.

Shown in FIG. 5 is the relative positioning between the hydraulic cylinder and the U-notch. The piston rod 44 of the hydraulic cylinder 43 has a long cross pin 46 as a top end thereof, which is received in the U-notches 51, 51 shown by phantom lines, with one end being lockingly retained by a rotary plate 71 with a brim.

The rotary plate 71 is a detector member for a magnetic sensor, which is rotatably mounted to the cover tube 42. The plate 71 cooperates with a first magnetic sensor 72 and a second magnetic sensor 73, mounted to a vehicle body now shown, to detect the position of the piston rod 44 and hence the cross pin 46 to thereby detect the vertical position of the work machine.

Desirably, the top end of the piston rod 44 may be the cross pin 46, but a pipe, a rod, or a bar may also be used in its stead.

Figure 6A:
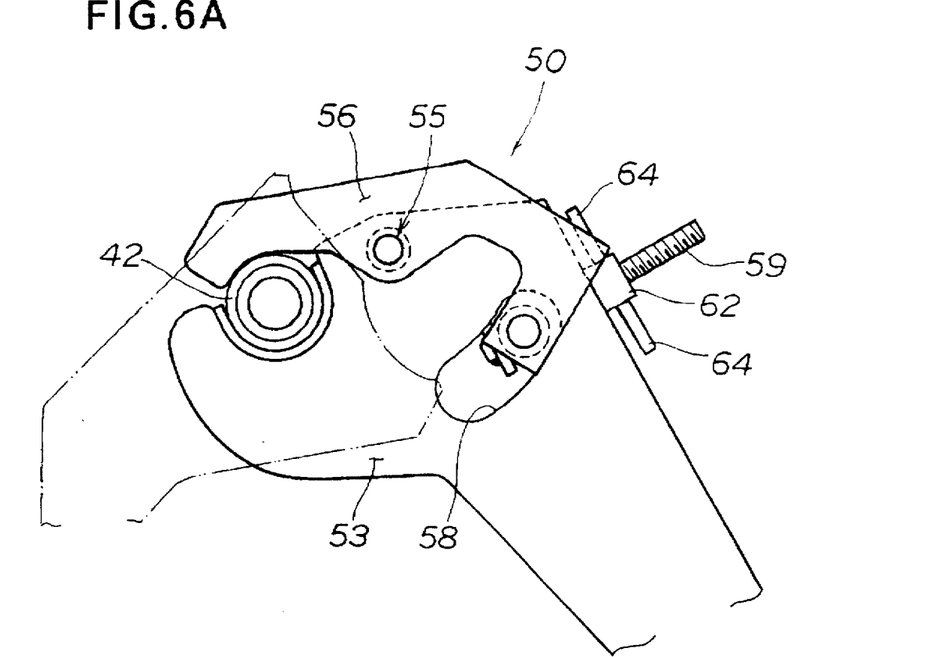
FIG. 6A is a side elevational view illustrating the essential portions and operation of the hitch structure according to the present invention.
Figure 6B:
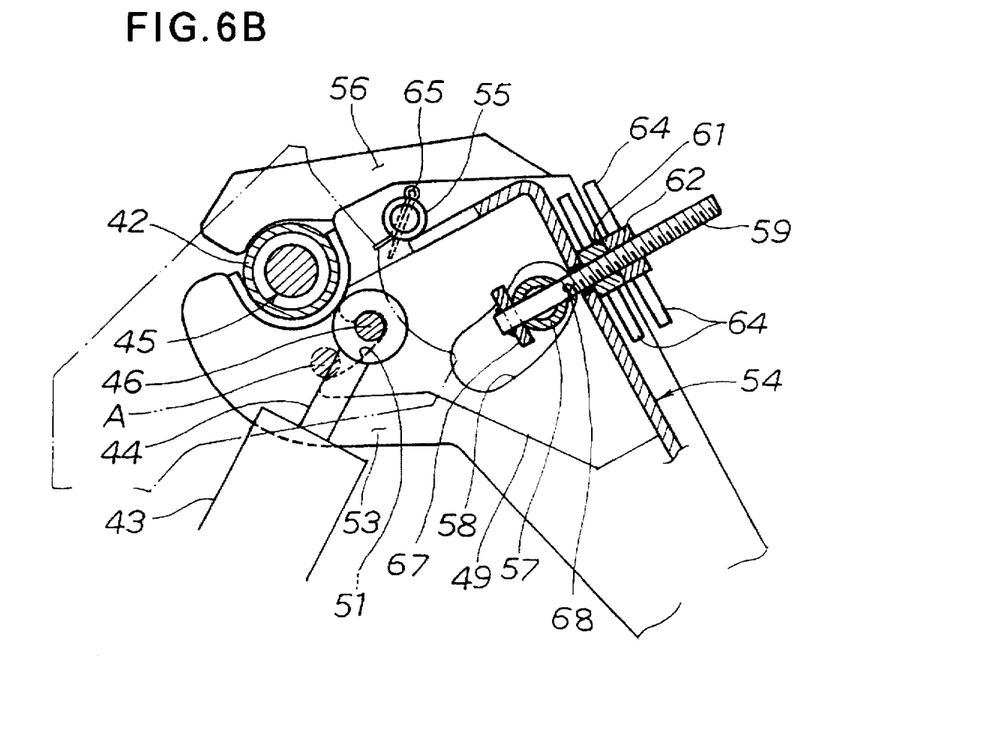
FIG. 6B is a side elevational view illustrating, partially in section, the essential portions and operation of the hitch structure.

Reference is now had to FIG. 6A and FIG. 6B in which the essential portions and operation of the hitch structure according to the present invention are shown respectively in side elevation and partial cross-section.

As shown in FIG. 6B, the bolt 59 extends through the cross shaft 57 and then through the connector plate 54 and is threadedly engaged with the nut 61 and lock nut 62. Designated by 64, 64 are finger hooking bars for turning the nuts 61, 62 using fingers. 65 designates a split pin for preventing the pin 55 from coming off.

Bolt 59 has a piece plate 67 received in a notch of the cross shaft 57 for preventing turning thereof, as well as a lock pin 68 for preventing offcoming thereof relative to the cross shaft 57.

Operation of the hitch structure thus arranged will now be discussed.

Fastening or turning of the nut 61 shown in FIG. 6B causes the upper jaw plate 56 to turn counter-clockwise about the pin 55 and to cooperate with lower jaw plate 53 to thereby retain the cover tube 42 in a sandwiched fashion. The cover tube 42 is provided internally with a work machine drive shaft 45.

Cross pin 46 is fully fit into the U-notches 51, 51 (one on the viewer side is not shown). Although the hitch in a released condition will be discussed below in relation to the succeeding drawing figures, it should be noted that for releasing the hitch, the cross pin 46 must be brought down to a position shown by phantom line A, as shown in FIG. 6B. Specifically, the manual descent button 35d (see FIG. 2) is pressed to cause the piston rod 44 of the hydraulic cylinder 43 to move down to the phantom line A.

Figure 7A:
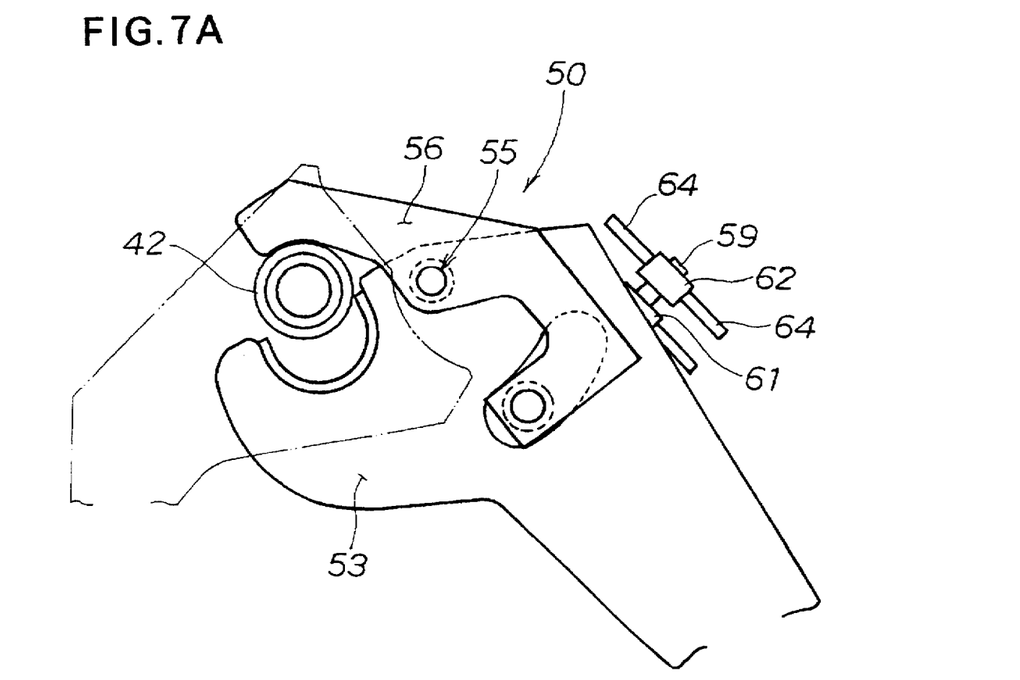
FIG. 7A is a side elevational view showing the operation of the hitch structure.
Figure 7B:
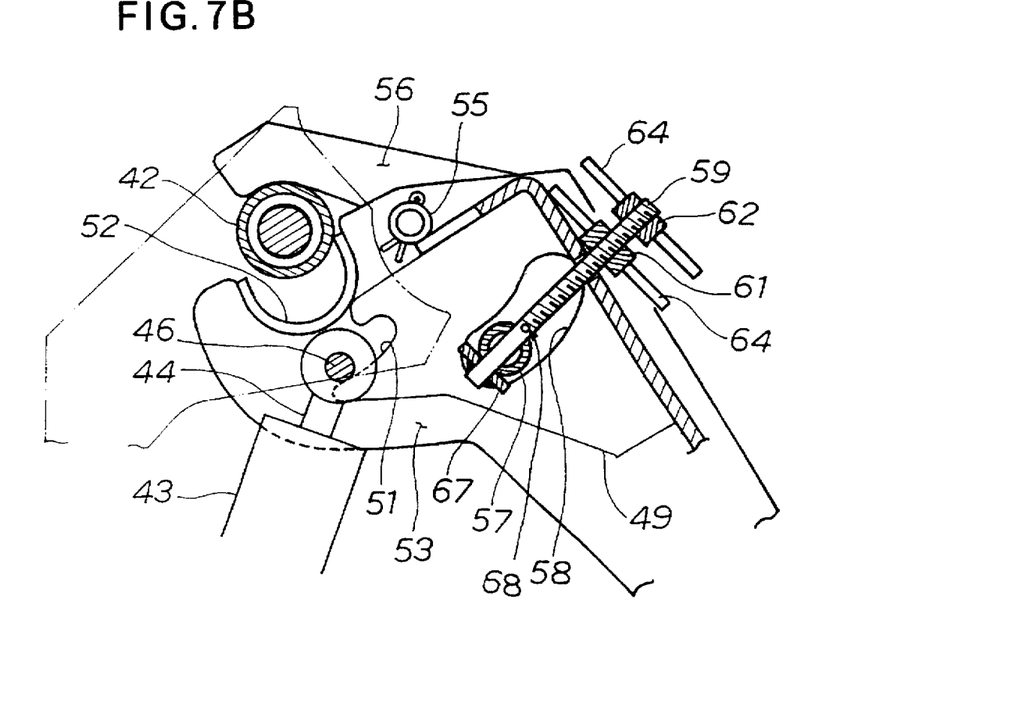
FIG. 7B is a side elevational view showing, partially in section, the operation of the hitch structure.

Reference is now made to FIG. 7A illustrating the operation of the hitch structure according to the present invention and to FIG. 7B illustrating, in partial cross-section, the hitch structure in a released condition.

In FIG. 7B, as the lock nut 62 and nut 61 are loosened, the cross shaft 57 moves the arc-shaped groove 58 downwardly. The cross pin 46 is sufficiently lowered so that it does not present a bar to the releasing.

As a result, the upper and lower jaw plates 56, 53 are placed in an opened position as shown in FIG. 7A, whereby the plates 56, 53 can be released from the cover tube 42 in a rightward direction of the drawing figure. These jaw plates are easy to handle because the upper jaw plate 56 is partially hung onto the cover tube 42 until the plates are completely released.

For mounting the upper and lower jaw plates 56, 53, the upper jaw plate 56 is hung onto the cover tube 42 in such a manner as illustrated in FIGS. 7A and 7B, whereafter the nut 61 shown in FIG. 7B is fastened. This causes the upper jaw plate 56 to come closer to the lower jaw plate 53 about the pin 55. As a result, the jaw plates 56, 53 take the form as shown in FIGS. 6A and 6B. Next, the nut 61 is fully fastened, followed by fastening the lock nut 62. Finally, the manual ascent button 35u (see FIG. 2) is operated to bring the cross pin 46 at the phantom line A position up to the solid line position, thus completing the mounting operation.

Consequently, as seen from FIG. 6A, the hitch 50 thus arranged has little play and thus achieves tight coupling. The drive sprocket 32 and driven sprocket 33 of the chain case 31 shown in FIG. 2 are mounted to the work machine drive shaft 45 and the input shaft of the reduction mechanism case 23 shown in FIG. 3 so that the hitch 50 produces little play, whereby the space L between the drive and input shafts is kept constant, thus prolonging the life of the chain case 31, especially the internal chain 34. Further, since it does not involve pin insertion and pullout and subsequent parts removal operations as required in the conventional arrangement, the inventive hitch is free from worries about the parts being lost. Moreover, since the nut 61 and lock nut 62 are provided with the finger hooking bars 64, 64, the nuts 61, 62 can be manually turned easily without using special tools.

It may readily be understood by those skilled in the art that although the above embodiment has been described in relation to a rotary tiller, this should not be construed as limiting thereto. Alternatively, the work machine may be a weeding rotor or any other administrative work machines.

It should also be noted that the bolt 59 shown in FIG. 6B may carry a split pin passing crosswise therethrough, or the threads of the bolt top end may be crushed, for preventing the lock nut 62 from coming off the bolt.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A hitch structure comprising:
   a support frame adapted to be mounted to an end of a work vehicle;
   a tube supported crosswise on said support frame; and
   a hitch for connecting an end of a work machine to said tube, said hitch comprising:
   at least one upper jaw plate and at least one lower jaw plate each having a recess for receiving said tube, said upper and lower jaw plates being pivotally connected together by means of a pin, one of said upper jaw plate and said lower jaw plate having an arc-shaped groove extending arcuately about said pin, and a portion extending parallel to said pin, the other of said upper jaw plate and said lower jaw plate having a cross shaft received in and movable along said arc-shaped groove; and
   a moving member for moving said upper and lower jaw plates pivotally and relatively toward and away from each other, said moving member including a bolt connected to said cross shaft and extending through said portion of said one jaw plate, and a nut threaded with said bolt and held in contact with said portion of said other jaw plate, wherein when said nut is turned in one direction, said bolt moves in one direction along an axis thereof to cause said other jaw plate to turn about said pin toward said one jaw plate to firmly grip said tube between said one and other jaw plates with said tube being received in said recesses, and when said nut is turned in the opposite direction, said bolt moves in the opposite direction along the axis thereof to cause said other jaw plate to move away from said one jaw plate to allow said tube to be released from said one and other jaw plates.

2. A hitch structure according to claim 1; wherein said nut has a finger hooking bar for manually turning said nut without using a tool.

3. A hitch structure according to claim 1; further comprising a hydraulic cylinder mounted to said end of said work vehicle and having a piston rod and a downwardly-opened U-shaped notch disposed at said end of said work machine for receiving a top end of said piston rod, said hydraulic cylinder being operative to move said top end into and out of said U-shaped notch when said work machine is connected to said work vehicle.

4. A hitch structure according to claim 1; wherein said moving member further includes a lock nut threaded with said bolt for releasably locking said nut in a given position.

5. A hitch structure according to claim 4; wherein said lock nut has a finger hooking bar for manually turning said lock nut without using a tool.

6. A hitch structure according to claim 1; wherein the pin is integrally connected to the one of the upper and lower jaw plates having the arc-shaped groove.

7. A hitch structure for a vehicle comprising:
   a pair of support frames adapted to be mounted to an end of a vehicle;
   a cross member supported between the support frames for releasable connection to an implement;
   at least one first jaw member having a recessed portion for receiving a first portion of the cross member;

at least one second jaw member having a recessed portion for receiving a second portion of the cross member;

connecting means for pivotally connecting the first jaw member to the second jaw member; and moving means for pivotally moving the first and second jaw members toward and away from each other;

wherein when the moving means pivotally moves the first and second jaw members toward each other, the recessed portion of each of the first and second jaw members engage the first and second portions of the cross member, respectively, and when the moving means pivotally moves the first and second jaw members away from each other, the recessed portion of each of the first and second jaw members disengage from the first and second portions of the cross member, respectively.

8. A hitch structure according to claim 7; wherein one of the first and second jaw members has a groove, and the other of the first and second jaw members has a shaft member movable along the groove.

9. A hitch structure according to claim 8; wherein the moving means comprises a bolt connected to the shaft member, and a nut threadedly engaged with the bolt; wherein when the nut is turned in a first direction, the bolt moves the shaft member along the groove to move one of the first and second jaw members having the shaft member away from the other of the first and second jaw members, and when the nut is turned in a second direction, the bolt moves the shaft member along the groove to move one of the first and second jaw members having the shaft member away from the other of the first and second jaw members.

10. A hitch structure according to claim 9; further comprising means integral with the nut for manually turning the nut in the first and second directions without using a tool.

11. A hitch structure according to claim 9; wherein the moving means further comprises a lock nut threadedly engaged with the bolt to prevent loosening of the nut.

12. A hitch structure according to claim 11; further comprising means integral with the lock nut for manually turning the lock nut in the first and second directions without using a tool.

13. A hitch structure according to claim 9; further comprising a hydraulic cylinder mounted to the end of the vehicle and having a piston rod, and a U-shaped notch disposed at the end of the implement for receiving an end of the piston rod, the hydraulic cylinder being operative to move the end of the piston rod into and out of the U-shaped notch when the implement is connected to the vehicle.

14. A hitch structure according to claim 13; further comprising detecting means for detecting a position of the piston rod to thereby detect a position of the implement.

15. A hitch structure according to claim 14; including a cross pin at the end of the piston rod; and wherein the detecting means comprises a detector member connected to one end of the cross pin.

16. A hitch structure according to claim 7; wherein the connecting means has a hole in each of the first and second jaw members, and a pin extending into the holes, the holes having a diameter sufficient to allow pivotal movement of the first and second jaw members about the pin but preventing clearance and play between the pin and the holes.

17. A hitch structure for a vehicle comprising:

a pair of support frames adapted to be mounted to an end of a vehicle;

a cross member supported between the support frames for releasable connection to an implement;

a pair of first jaw members each having a recessed portion for receiving a first portion of the cross member;

a shaft member integrally connecting the first jaw members in spaced relationship to one another;

a pair of second jaw members each having a recessed portion for receiving a second portion of the cross member;

a connector member integrally connecting the second jaw members in spaced relationship to one another;

connecting means for pivotally connecting the first pair of jaw members to the second pair of jaw members; and moving means for pivotally moving the first and second pairs of jaw members toward and away from each other;

wherein when the moving means pivotally moves the first and second pairs of jaw members toward each other, the recessed portion of each of the first jaw members and the recessed portion of each of the second jaw members engage the first and second portions of the cross member, respectively, and when the moving means pivotally moves the first and second pairs of jaw members away from each other, the recessed portion of each of the first jaw members and the recessed portion of each of the second jaw members disengage from the first and second portions of the cross member, respectively.

18. A hitch structure according to claim 17; wherein each of the second jaw members has a groove receiving the shaft member for movement along the grooves during pivotal movement of the first and second pairs of jaw members.

19. A hitch structure according to claim 18; wherein the moving means comprises a bolt connected to the shaft member, and a nut threadedly engaged with the bolt; wherein when the nut is turned in a first direction, the bolt moves the shaft member along the grooves to move the first pair of jaw members away from the second pair of jaw members, and when the nut is turned in a second direction, the bolt moves the shaft member along the grooves to move the first pair of jaw members away from the second pair of jaw members.

\* \* \* \* \*